Patented Feb. 8, 1944

2,341,339

UNITED STATES PATENT OFFICE 2,341,339

OXIDATION OF ACROLEIN TO ACRYLIC ACID

Hanns Peter Staudinger, Ewell, and Karl Heinrich Walter Tuerck, Banstead, England, assignors to The Distillers Company Limited, Edinburgh, Scotland, a British company No Drawing. Application September 20, 1941, Serial No. 411,758. In Great Britain September 21, 1940

3 Claims. (Cl. 260—530)

This invention is for improvements in or relating to the oxidation of acrolein to acrylic acid.

Several processes for oxidising acrolein to acrylic acid have been described in the literature, but all these processes have suffered from the fact that the oxidation, as hitherto practised, has been slow and polymerisation of both the acrolein and the acrylic acid produced by the process takes place at a rapid rate. This polymerisation is thought to be due either to the prolonged action of the oxygen itself, or more probably to the action of per compounds formed as intermediate compounds during the reaction.

According to the present invention, the oxidation of acrolein is carried out by reaction with molecular oxygen, that is oxygen itself, or gases containing oxygen, in the presence of the acidic compounds of vanadium such as vanadic acid. The catalyst is preferably freshly prepared from the corresponding salts by hydrolysis or by the action of acids.

The use of vanadic acid as catalyst not only considerably reduces the reaction time, but also permits the use of lower temperatures than has been possible hitherto with a consequent diminution in the tendency to polymerisation. The temperature should preferably not be allowed to exceed 45° C. during the oxidation and generally speaking a temperature of 20–30° C. will be found to give most satisfactory results. Though the solution contains a considerable amount of peracid and peroxide the monomeric acrylic acid is obtained in very good yields.

The oxidation may be carried out in the presence of solvents preferably water-miscible solvents such as the lower organic acids, e. g., acetic acid or acrylic acid, alcohols or ketones. It is also possible to carry out the oxidation in the presence of water and a satisfactory method of operation is to use the catalyst, e. g., vanadic acid, in the form of its aqueous solution or suspension. It is possible according to the process of the present invention to carry the oxidation substantially to completion, without undue polymerisation taking place.

We have found that polymerisation of the unsaturated acid produced by the process can be prevented during the recovery of the product by the use of substances which decompose the formed peroxides which promote polymerisation. An example of such a substance is sulphur dioxide. As the rate of oxidation is high the process may be carried out in a continuous manner. It is also possible to carry out the oxidation under such condition that the acid anhydride is formed.

The oxidation is normally carried out at ordinary pressure but, if desirable, increased pressure may be employed.

Instead of recovering the acrylic acid as such, it may be recovered in the form of its esters. The oxidised reaction mixture may, for example, be treated with acetylene in the presence of suitable catalysts, such as mercuric oxide, and the acrylic acid converted directly into vinyl acrylate. Alternatively, the reaction mixture may be treated with an alcohol and an esterification catalyst. Yet another method is to cause esterification of the acrylic acid to take place simultaneously with the oxidation by carrying out the oxidation in the presence of an alcohol. If in the latter process the temperature is maintained at a low level, the formation of acrolein acetal can be substantially avoided.

The process is applicable not only to the oxidation of acrolein but also to the oxidation of $\alpha$-chloro-acrolein.

The following examples illustrate the manner in which the invention is carried into effect in the production of acrylic acid.

Example 1

Oxygen was introduced into 40 grams of acrolein dissolved in 50 grams of acetic acid containing 4 cc. of a 1% solution of freshly prepared vanadic acid in water. The oxygen is introduced in the form of fine bubbles whilst the temperature is maintained between 24° and 34° C. Within four hours 70% of the original quantity of acrolein was oxidised to acrylic acid without the formation of any appreciable quantity of polymerisation products. Taking into account the unchanged acrolein the efficiency of the process was 89%.

Example 2

32 grams of acrolein were dissolved in 40 cc. of acetone and 5 cc. of acetic acid. The solution was then treated with oxygen in the presence of 2 cc. of a 1% aqueous vanadic acid solution at 30° C. After five hours 64% of the acrolein was oxidised to acrylic acid while 30% remained unchanged. No polymerisation was observed.

Example 3

A mixture containing 50 grams absolute alcohol, 43 grams acrolein, 5 cc. acetic acid and 2 cc. of a 1% aqueous vanadic acid solution was treated with oxygen at about 30° C. After a short induction period the absorption of oxygen increased so markedly that intensive cooling was necessary. The reaction product contained 32% acrylic acid and 62% of ethyl acrylate. No polymerisation was observed.

Example 4

The voluminous precipitate obtained by heating sodium-vanadate with acetic acid was re-dispersed in acetic acid and added to an acetic acid solution containing 40% by weight of acrolein. This solution was oxidised at 10° C. by passing in oxygen under a pressure of 1300 mm. Hg. The yield of monomeric acrylic acid was 93.2%, 87.0% of the acrolein initially present having undergone reaction.

Example 5

A 40% solution of acrolein in xylene was oxidised for 5 hours at 32° C. in the presence of a catalyst, made by heating solid vanadium pentoxide which is dispersed in acetic acid with small amounts of hydrogen peroxide, so that the solid vanadium pentoxide partially dissolves. By adding the calculated amount of acetic anhydride the water in the catalyst solution is removed. The yield of monomeric acrylic acid was 92%.

What we claim is:

1. A process for the manufacture of acrylic acid comprising treating acrolein in presence of acetic acid with an oxygen-containing gas in the presence of a catalyst comprising an aqueous solution of vanadic acid at a temperature not exceeding 45° C. to produce a reaction product containing monomeric acrylic acid and peroxidic compounds.

2. A process according to claim 1 wherein the reaction is carried out at a temperature of 20 to 30° C. and in presence of a water-miscible organic solvent.

3. A process according to claim 1 wherein the catalyst is prepared in situ by reaction between vanadium pentoxide, acetic acid and hydrogen peroxide.

HANNS PETER STAUDINGER.
KARL HEINRICH WALTER TUERCK.